(12) United States Patent
Peirano

(10) Patent No.: US 7,458,339 B1
(45) Date of Patent: Dec. 2, 2008

(54) ANIMAL RESTRAINT

(76) Inventor: Howard P. Peirano, 179 Deerfield Ter., Mahwah, NJ (US) 07430

( * ) Notice: Subject to any disclaimer, the term of this patent is extended or adjusted under 35 U.S.C. 154(b) by 45 days.

(21) Appl. No.: 11/399,805

(22) Filed: Apr. 7, 2006

(51) Int. Cl.
*A01K 15/04* (2006.01)
(52) U.S. Cl. ........................ 119/815; 119/850
(58) Field of Classification Search ............... 119/815, 119/850, 853, 792, 907; D30/145, 152; 54/79.2
See application file for complete search history.

(56) References Cited

U.S. PATENT DOCUMENTS

| | | | | |
|---|---|---|---|---|
| 3,141,443 | A * | 7/1964 | Huey | 119/854 |
| D228,926 | S * | 10/1973 | Bennett | D30/145 |
| 5,068,921 | A * | 12/1991 | Jones | 2/2.5 |
| 5,349,927 | A * | 9/1994 | Campbell | 119/815 |
| D379,686 | S * | 6/1997 | Caditz | D30/145 |
| 5,839,393 | A * | 11/1998 | Rupp et al. | 119/712 |
| D413,186 | S * | 8/1999 | Brown | D30/145 |
| 5,941,199 | A * | 8/1999 | Tamura | 119/850 |
| 5,996,537 | A * | 12/1999 | Caditz | 119/850 |
| D419,270 | S * | 1/2000 | Ruscitti | D30/145 |
| 6,234,117 | B1 * | 5/2001 | Spatt | 119/850 |
| 6,431,123 | B1 * | 8/2002 | Hibbert | 119/850 |
| 6,463,887 | B1 * | 10/2002 | Thomas | 119/850 |
| 6,477,988 | B2 * | 11/2002 | Burnett | 119/850 |
| 6,584,939 | B1 * | 7/2003 | Brezinski | 119/850 |
| 6,694,924 | B2 * | 2/2004 | Clark | 119/850 |
| 6,694,925 | B2 * | 2/2004 | Critzer | 119/850 |
| D511,868 | S * | 11/2005 | Cherrett | D30/145 |
| 7,021,246 | B2 * | 4/2006 | Seymour | 119/850 |
| 7,121,231 | B2 * | 10/2006 | Benefiel | 119/850 |
| 2004/0045512 | A1 * | 3/2004 | Goudal | 119/850 |
| 2005/0072376 | A1 * | 4/2005 | Kerrigan | 119/850 |
| 2005/0263104 | A1 * | 12/2005 | Lazarowich | 119/850 |
| 2005/0284416 | A1 * | 12/2005 | Smit et al. | 119/850 |
| 2006/0090711 | A1 * | 5/2006 | Richards | 119/850 |
| 2006/0278177 | A1 * | 12/2006 | Crawford | 119/850 |

* cited by examiner

*Primary Examiner*—Yvonne R. Abbott
(74) *Attorney, Agent, or Firm*—W. Patrick Quast

(57) ABSTRACT

An animal restraint for preventing an animal from biting or licking an area of concern. The animal restraint is comprised of a rigid but flexible protector having an enclosed neck section and an open chest area, the restraint being strap secured around the thoracic area of the animal. Once in place the device permits fully normal activity for the animal while limiting head motion of potential harm to a healing body area. To use the device it is simply slipped over the animal's head and easily strap secured to the animal's chest, and is removed with equal facility.

14 Claims, 5 Drawing Sheets

ANIMAL RESTRAINT

This invention relates to animal restraint devices and methods preventing an animal from licking and biting areas of their bodies, and in particular for limiting an animal's head motion without noticeable discomfort to the animal.

BACKGROUND

A well observed problem facing dog and cat owners is what to do when their pet bites and licks area of their bodies under treatment for a skin condition or a recent surgical procedure. Many solutions have been proposed and are currently in use. For example, in U.S. Pat. No. 4,286,547 an animal restraint unit is disclosed. A collar 2 and waistband 3 (FIG. 1) are interconnected pivotally by a pair of lateral pieces 4 and 5 (FIG. 2), thereby limiting the animal's head movements. The animal's movement can be further suppressed with a mandible engagement attachment 28, 29 (FIGS. 10 and 11), and a thoracic attachment 33 (FIG. 12).

In U.S. Pat. No. 5,307,764, a protective pet collar is disclosed. A foam pad 14 enclosed in a fabric 15 backed sheet of plastic 13 (FIG. 3) forms a VELCRO fastened collar 10, thereby preventing the animal from making contact between its mouth and its body.

Again, in U.S. Pat. No. 5,778,828, a protective pet collar is disclosed. Two sheets 12, 14 of plastic form a protection collar 10 (FIG. 1) around an animal's neck, thereby preventing biting or licking affected areas of its body. Means are provided for adjustably attaching the two sheets together in parallel such that the proximal edges are located adjacent to each other and forming the protective collar with an adjustable width to accommodate different sizes of an animal's neck.

U.S. Pat. No. 5,915,337 teaches an interlockable pet collar for preventing an animal from biting or licking the affected injured areas of its body. The interlockable pet collar 10 (FIG. 1) discloses a multiplicity of open frame structures (FIGS. 2 and 6) interconnected to each other so as to form an open frame pet collar adjustable to the animal's neck size. Additionally, size adjustable tubular shaped collars 210, 310 (FIGS. 9 and 10) are disclosed.

While the above noted devices describe useful approaches to solving this problem they do not disclose the simple and easy connection of the restraint, the greater degree of comfortable mobility afforded the animal, and the economy of fabrication inherent in the present invention.

It is therefore a primary object of the present invention to provide an effective animal restraint for preventing biting and licking afflicted areas of the animal's body. An additional object is to provide for quick and easy attachment of the restraining device to the animal.

Still another object is to provide an economical animal restraint.

Yet another object is to provide an animal restraint that is comfortable for the animal to wear.

A further object is to provide an animal restraint fabricated from a single piece of rigid, flexible plastic.

An additional object is to provide an animal restraint covering large areas of the animal's body.

SUMMARY

These and other objects are obtained with the animal restraint of the present invention.

Pet owners confronted with a pet doing additional harm to a damaged area of its body by biting and licking obviously want the best possible solution. Existing devices, while often extremely helpful, generally present the animal with considerable discomfort.

On the other hand, sweaters and raingear specifically designed for domestic animals, such as dogs and cats, seem to be tolerated without difficulty by most pets. Utilizing this concept an animal restraint has been constructed out of a single sheet of plastic. Many different materials can, of course, be employed, including cloth, leather, and even metals, with a rigid but flexible sheet of plastic such as low density polyethylene being particularly well suited.

As will be more fully explained below, a template of a form of the animal restraint can be placed on a generally rectangularly shaped sheet of plastic. Once cut our from the sheet, lateral opposed edges of the form can be brought together and secured in a variety of ways, such as using adhesives, heat sealing, or using apertures created at these edges for permitting a screw attachment, or the use of miniature rivets. Secured in this manner the animal restraint of the present invention will assume a partially cylindrical shape, having a generally tubular shaped front opening, a solid top and solid left and right sides, and an open base portion extending from the front opening to the generally hemispherically shaped rear opening. Adjustable straps are affixed to the left and right sides of the rear opening opposite the top portion, thereby completing the structure. To accommodate animals of different size, the animal restraint can be made available in small, medium, and large sizes.

To use the animal restraint of the invention, the attendant simply takes the device in one hand, guides the head of the animal into the front opening and flips the body of the restraint over the animal. The adjustable strap is now secured beneath the chest of the animal. If the device has been previously used and the strap adjustment for the animal's chest size already made, a clip fastener with matching slot is employed for an instant connection.

The gently curvature of the animal restraint over the neck, down the back, and around the shoulders of the animal, permits normal drinking and eating, running and playing—in short, normal activity while completely eliminating biting and licking of concerned body areas.

DETAILED DESCRIPTION

Figure 1:
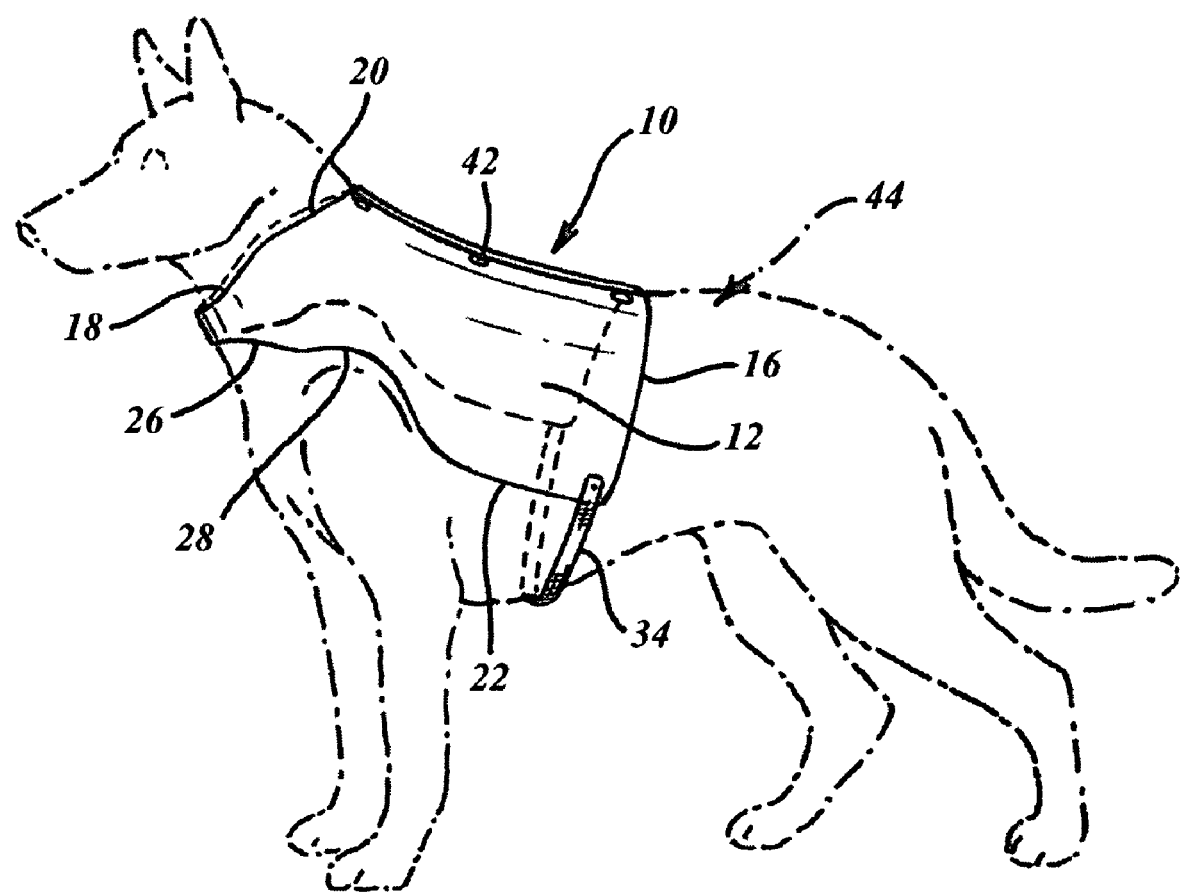
FIG. 1 is a partially schematic, perspective view of one version of the animal restraint of the invention in place, secured to a dog.

Turning now to the drawings wherein similar structures having the same function are denoted with the same numerals, in FIG. 1 a version of the animal restraint 10 of the invention is depicted secured to a dog 44.

Figure 5:
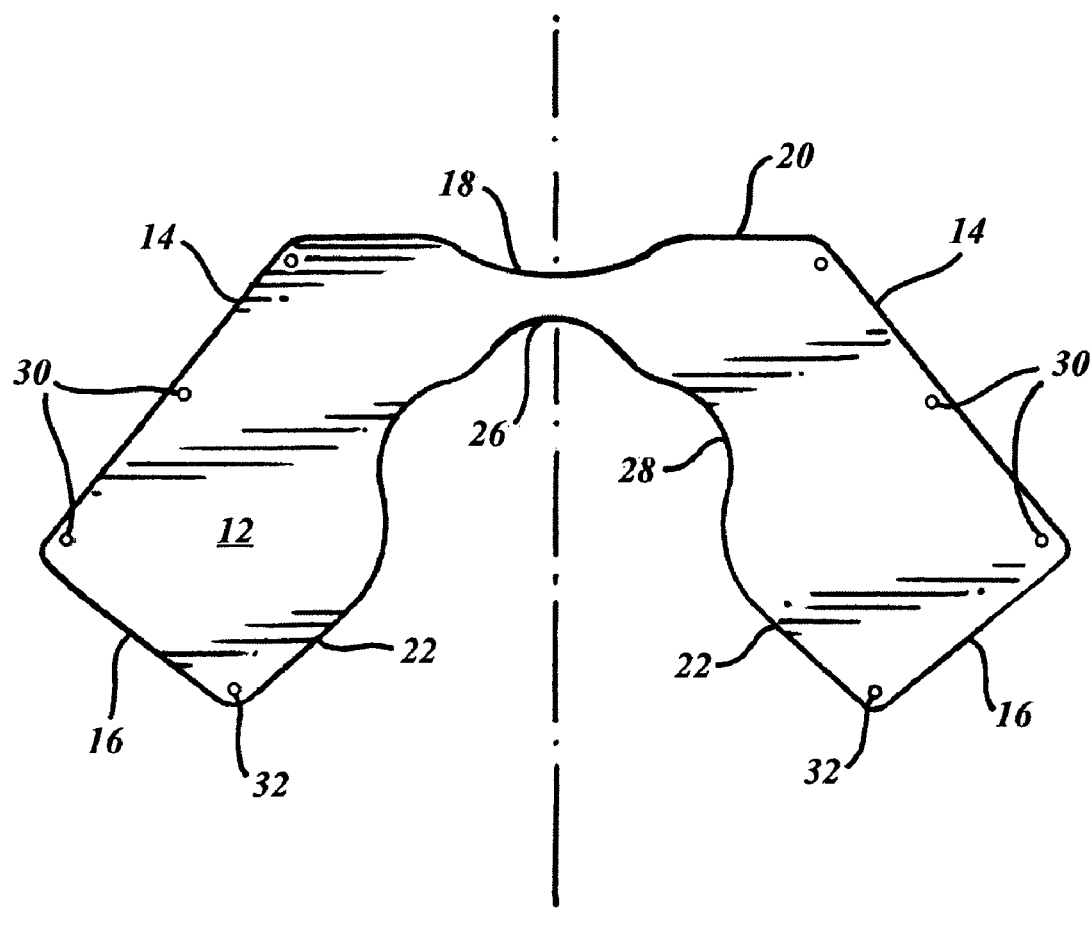
FIG. 5 is a top plan view of one version of a method of manufacture for the animal restraint of the invention.

While the animal restraint 10 can be fabricated out of several pieces being affixed together, one economical method of fabrication would be to use a template to cut a form of the animal restraint from a sheet of material. The material could be cloth, leather, metal, but preferably a sheet of rigid, flexible plastic such as low density polyethylene. As best seen in FIG. 5 the form 12 would comprise mirror image linear left and right sides 14 obtuse angled in respect to each other, with front and rear edge cut-outs to gently conform the animal restraint 10 to the body of an animal when the form is joined together. The front edge cut-outs comprise a concave center curvature 18 with a pair of adjacent slightly convex cut-outs 20 for placement over the animal's head and neck. Rear edge cut-outs comprise a cooperating concave center curvature 26 adjacent the front end concave cut-out 18 for comfortably securing around the animal's neck, with a pair of adjacent lateral concave cut-outs 28 for placement over the animal's shoulder areas 48. A pair of linear lengths 22 of the plastic sheet 12 then connect with matching linear lengths 16 of the rear end of the animal restraint positioned perpendicular to the left and right sides 14. A series of apertures 30 along a top section of the left and right sides 14 are for conjoining the two halves of the form 12 together, with the pair of apertures 32 opposite the top section of the left and right sides, and adjacent the rear end or the animal restraint, are for affixing a pair of straps to secure the restraint to the chest area 50 of an animal.

Figure 2:
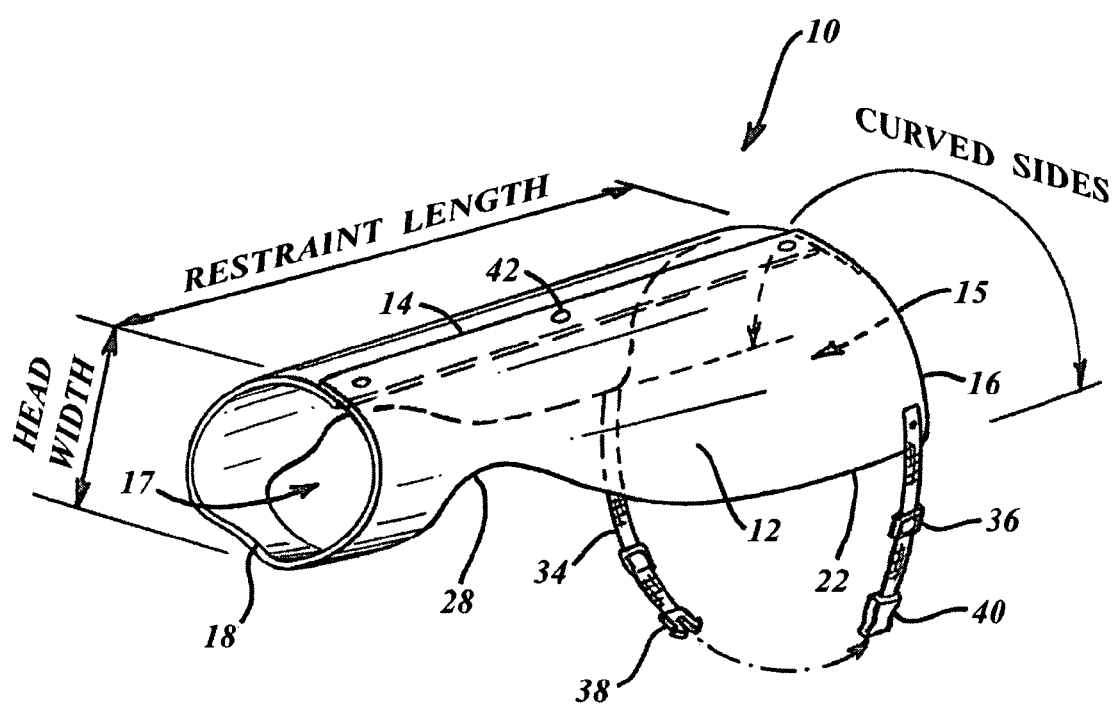
FIG. 2 is a partially schematic, perspective view of one version of the animal restraint of the invention, illustrating the structural relationship of component parts.

FIG. 2 illustrates a version of the complete animal restraint 10 of the invention, showing the left and right sides of the form 12 as having been brought together and secured with miniature aluminum rivets 42 affixed to apertures 30. Other methods for conjoining the two sides of the form can include adhesives, heat sealing, and nut and bolt securing. A pair of straps 34 are affixed to the opposed apertures 32 at the base sections 16 of the form in order to secure the animal restraint 10 to the chest area 50 of the animal. The straps 34 have additional length (not shown) for being lengthened or shortened using buckles 36 containing teeth (not shown) to secure the straps at selected lengths. A quick connect-disconnect at the free end of each strap is comprised of a female connector 40 on the end of one strap, the female connector having an aperture (not shown) for receiving a three prong male connector 38 on the end of the other strap, providing a snap-fit connector and disconnector. Alternatively, a variety of other means may be employed for securing the animal restraint to the chest of an animal, including a buckle and clasp belt arrangement, VELCRO hook and loop connectors on a pair of straps, and so on depending on designer preference.

The complete animal restraint 10 (FIG. 2) is seen as having an enclosed animal neck securing area comprised of front end cut-outs 18 and 20, and rear end cut-out 26, with an opening 17 to allow the passage therethrough of an animal's head 46, a rigid top section extending linearly from this front opening to an enlarged generally semi-circular rear opening 15, having straps 34 affixed at the base of the rear opening, with left and right sides 14 now curved to expose the chest and shoulder areas of an animal, and an open bottom area extending from the enclosed neck securing area to the rear opening 15.

Figure 3:
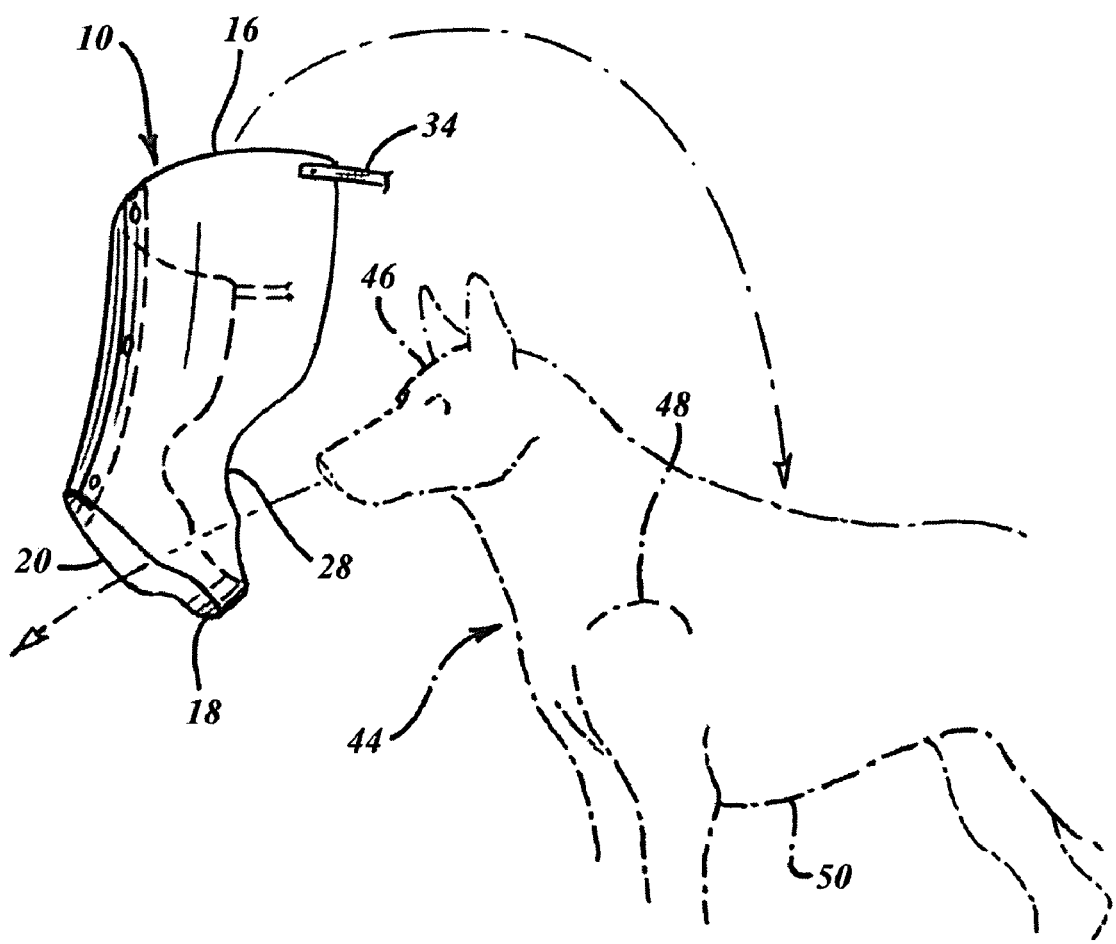
FIG. 3 is a schematic representation of one version of the animal restraint of the invention showing the restraint about to be positioned on a dog.

As clearly illustrated in FIG. 3, to use the animal restraint of the invention 10, the device is held in one hand and quickly and easily guided over the head of the animal. Straps 34 are now secured (FIGS. 1 and 4) to the thoracic area of the animal.

Figure 4:
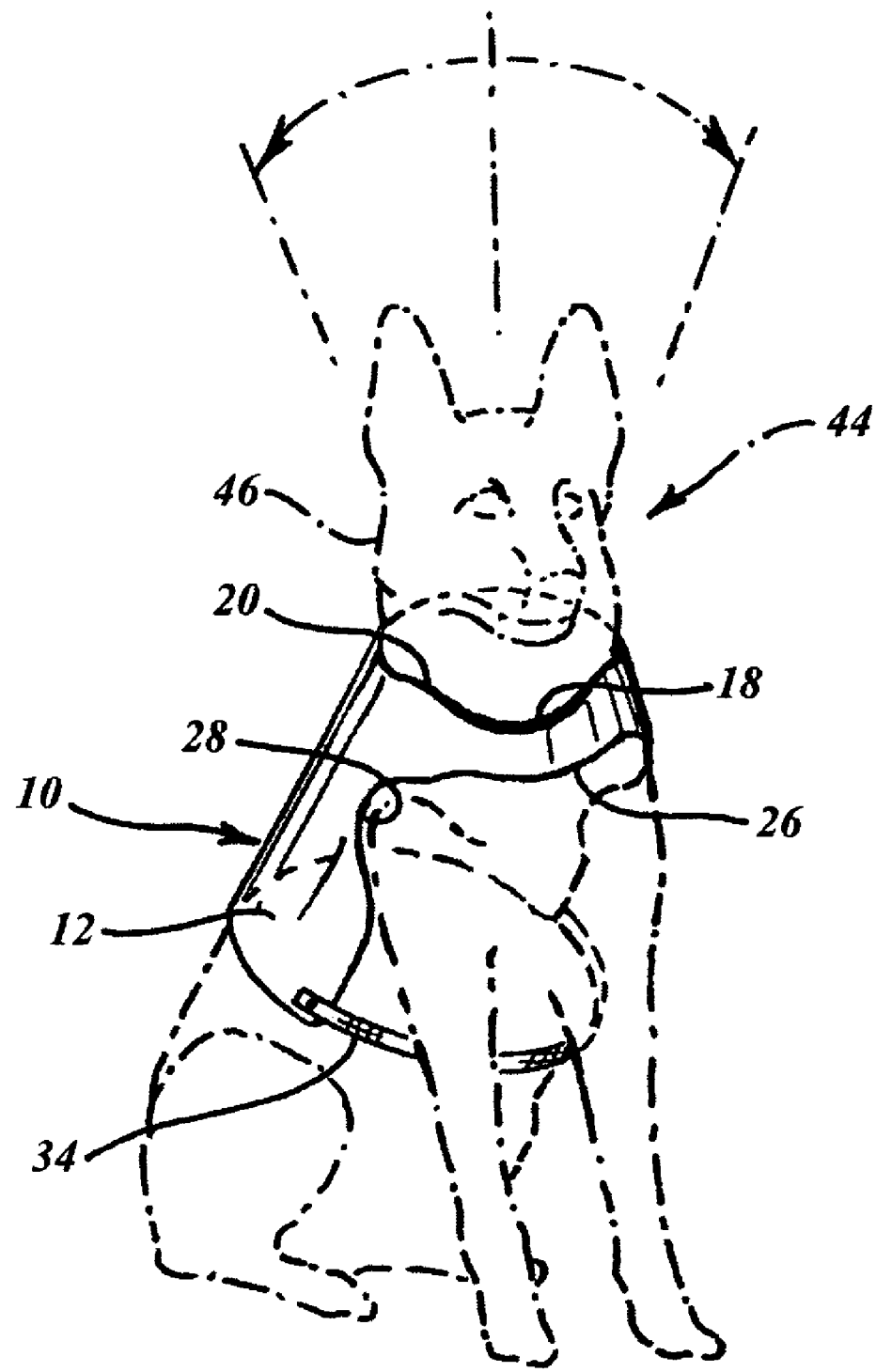
FIG. 4 is a schematic representation of one version of the animal restraint of the invention shown secured to a dog, illustrating restricted head movement of a dog.

FIG. 1 and FIG. 4 depict the animal restraint in position on a dog. The animal is now completely free to move about in a fully normal manner. The only movement restriction imposed on the animal is the inability to move its head left or right or up and down to a degree the animal would require to bite or lick a body area of concern.

While the present invention has been disclosed in connection with version shown in detail, various modifications and improvements will become readily apparent to those skilled in the art. Accordingly, the spirit and scope of the present invention is to be limited only by the following claims.

What is claimed is:

1. An animal restraint, comprising:
    (a) a form made from a rigid material and shaped to conform to a portion of a body of an animal;
    (b) said form having a substantially tubularly shaped neck encircling section having a front opening including a perimeter portion for engaging an upper neck portion of the animal depending on the head position of the animal and a rear opening including a perimeter portion disposed at a spaced distance from said front opening perimeter portion back along a longitudinal axis of said form and,
        a body section confluent with a portion of said neck encircling section not including said rear opening perimeter portion, said body section being substantially hemispherically shaped and extending a respective spaced distance from said neck encircling section back along said longitudinal axis to a substantially hemispherically shaped rear opening having a perimeter portion;
    (c) said body section having a solid top section and solid left and right sides contoured so as to cover a back area and left and right sides of the animal;
    (d) said body section further including a contour perimeter portion shaped to expose the lower torso of the animal including the left and right shoulders, front legs, and a chest area of the animal; and
    (e) said body section having means for securing said form to the animal between the front and rear legs the perimeter portion of said hemispherically shaped rear opening positioned on the torso of the animal between the front and rear legs when said form is in place on the animal, the rigidity of the material of said form sufficient, based at least on the type of material and thickness, such that said form is resistant to flexure along said longitudinal axis from said front opening perimeter portion to said rear opening perimeter portion and along said body section to at least a portion of said contour perimeter portion and said hemispherically shaped rear opening perimeter portion, so that when said form is secured to the animal, said neck encircling section cooperates with said body section to restrain the animal in the movement of its head beyond a certain distance in any direction due to the engagement of the upper neck portion of the animal with a respective portion of said perimeter portion of said front opening and the engagement of one or more of said rear opening perimeter portion, said contour perimeter portion or said hemispherically shaped rear opening perimeter portion with a respective body portion of the animal, whereby the force of resistance exerted at the points of contact of the form with respective portions of the animal's body is sufficient to restrain the animal in biting and licking parts of the animal of concern, while permitting otherwise normal motion of the animal.

2. The animal restraint according to claim 1 wherein said means for securing said form to said animal comprises a pair of length adjustable straps affixed at opposed peripheral edges of said body section adjacent a rear end of said form.

3. The animal restraint according to claim 2, further comprising at least one buckle for securing said straps on said body section to said animal.

4. The animal restraint according to claim 2, further comprising means for quick connection and disconnection of each one of said straps in said pair of straps to each other being affixed at each free end of each one of said straps in said pair of straps.

5. The animal restraint according to claim 1 wherein said form is fabricated in plastic.

6. The animal restraint according to claim 5 where in said form is fabricated in low density polyethylene.

7. The animal restraint according to claim 1 wherein said animal restraint is intended for a dog.

8. The animal restraint according to claim 1 wherein said animal restraint is intended for a cat.

9. The animal restraint according to claim 1 wherein said form is fabricated from a single sheet of material, said single sheet fabricated form having front and rear cut-out areas and mirror image left and right sides, a left side upper edge being conjoined with a matching right side upper edge so as to form said substantially tubular shaped encircling neck section and said substantially hemispherically shaped confluent body section.

10. The animal restraint according to claim 9 wherein said left side upper edge and said right side upper edge are conjoined with miniature rivets.

11. The animal restraint according to claim 9 wherein said sheet of material is plastic.

12. The animal restraint according to claim 11 wherein said sheet of material is low density polyethylene.

13. A method for preventing an animal from biting and licking an area of its body of concern, comprising the steps of:
  (a) creating an animal restraint form from a rigid material, said animal restraint form having a substantially tubularly shaped neck encircling section having a front opening and a rear opening with respective perimeter portions, said front opening perimeter portion for engaging an upper neck portion of the animal, said rear opening perimeter portion spaced a distance from said front opening perimeter portion along a longitudinal axis of said form and a body section confluent with a portion of said neck encircling section not including said rear opening perimeter portion, said body section being substantially hemispherically shaped and including a substantially hemispherically shaped rear opening having a respective perimeter portion, said body section extending a spaced distance from said neck encircling section along a back area of said animal and along said longitudinal axis of said form, said body section including a contour perimeter portion shaped to expose the lower torso of the animal including the shoulders, front and rear legs, and a chest area of the animal,
  the rigidity of the material of said form sufficient, based at least on the type of material and thickness, such that said form is resistant to flexure along said longitudinal axis extending from said front opening perimeter portion to said rear opening perimeter portion and further along said body section to at least a portion of said contour perimeter portion and said hemispherically shaped rear opening perimeter portion;
  (b) having an attendant grasp said form in one hand, and to then guide said animal's head through said rear opening and then out of said front opening of said neck encircling section; and
  (c) securing said body section of said form to a chest area of said animal between the front and rear legs, the perimeter portion of said hemispherically shaped rear opening positioned on the torso of the animal between the front and rear legs when said form is in place on the animal, said neck encircling section now cooperating with said body section to restrain head motion of said animal beyond a certain distance in any direction due to the engagement of an upper neck portion of the animal with a respective portion of said perimeter portion of said front opening and the engagement of one or more of said rear opening perimeter portion, said contour perimeter portion or said hemispherically shaped rear opening perimeter portion with a respective body portion of the animal, whereby the force of resistance exerted at the points of contact of the form with respective portions of the animal's body is sufficient to restrain the animal in biting and licking parts of said animal of concern, while permitting otherwise normal motion of said animal.

14. The method according to claim 13 wherein said animal restraint form is fabricated from a single sheet of plastic material.

* * * * *